United States Patent [19]

De Prado

[11] 4,166,638

[45] Sep. 4, 1979

[54] ADJUSTABLE DOLLY

[76] Inventor: Alfred De Prado, 2068 - 80th St., Brooklyn, N.Y. 11214

[21] Appl. No.: 899,982

[22] Filed: Apr. 25, 1978

[51] Int. Cl.² .......................................... B62D 21/14
[52] U.S. Cl. .............................. 280/638; 280/79.1 R
[58] Field of Search ............... 280/638, 79.1 R, 651, 280/79.1 A, 47.13 R, 652, 79.1

[56] References Cited

U.S. PATENT DOCUMENTS

| | | | |
|---|---|---|---|
| 1,000,199 | 8/1911 | Sautter | 280/651 X |
| 1,419,160 | 6/1922 | McKinnon | 280/638 |
| 2,675,245 | 4/1954 | Tobias | 280/652 |
| 2,733,076 | 1/1956 | Burnett | 280/652 |
| 3,102,648 | 9/1963 | Hughes | 280/651 X |
| 4,061,359 | 12/1977 | Metcalfe et al. | 280/638 |

*Primary Examiner*—Robert R. Song
*Assistant Examiner*—Norman L. Stack, Jr.
*Attorney, Agent, or Firm*—Howard I. Podell

[57] ABSTRACT

A wheeled platform base of adjustable length, fitted with straps for securing a load to the base, with projecting handles mounted to an end wall of the base and with shoulder padding fixed under the base end to enable a household mover to lift and support an end of the carriage on his shoulder for the moving of items of furniture placed on the base.

2 Claims, 6 Drawing Figures

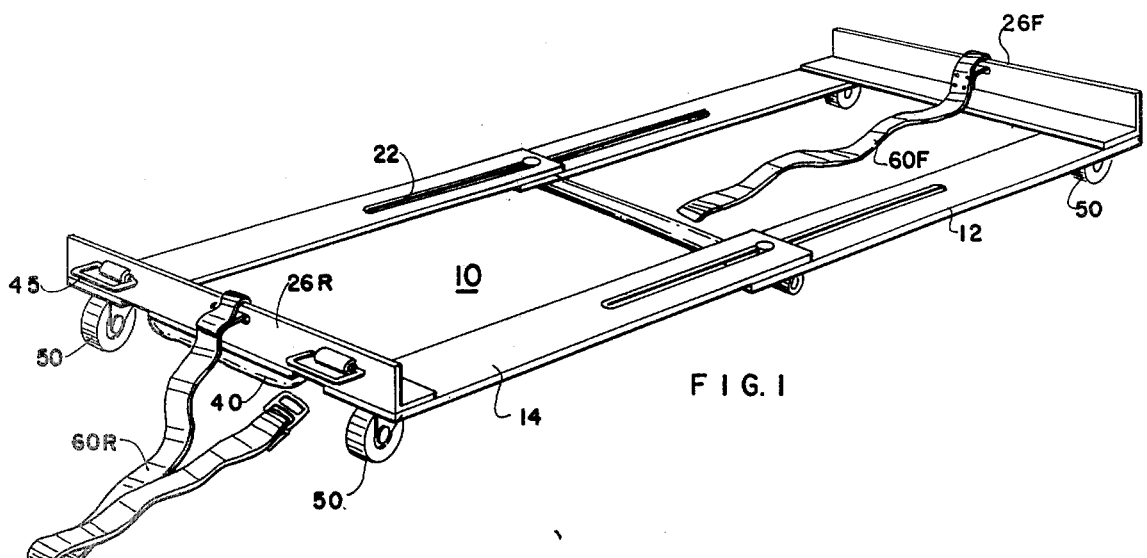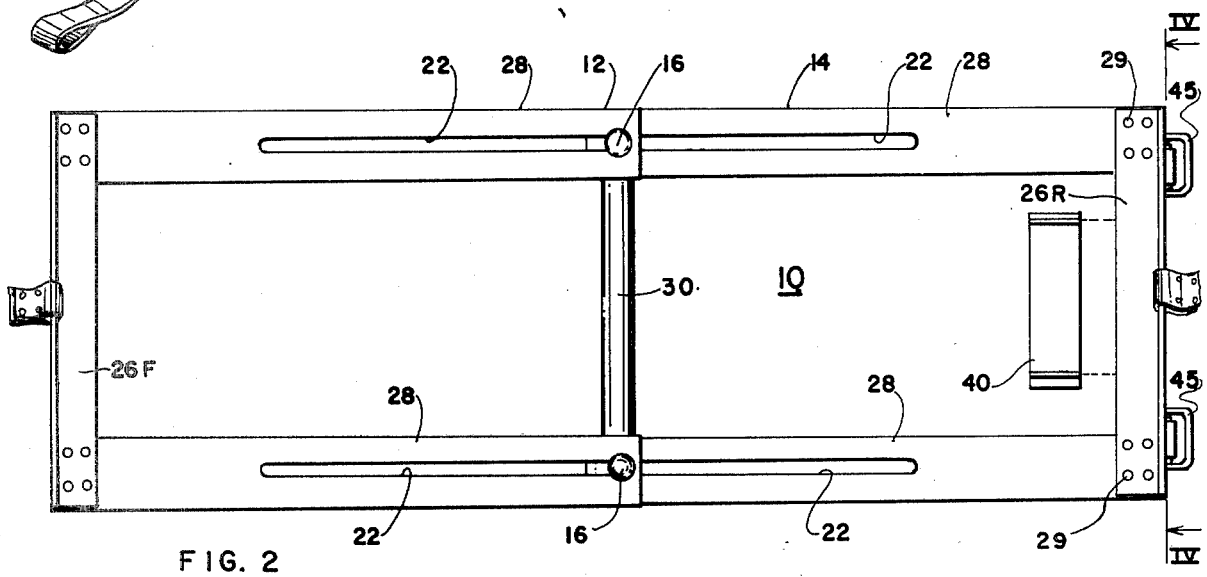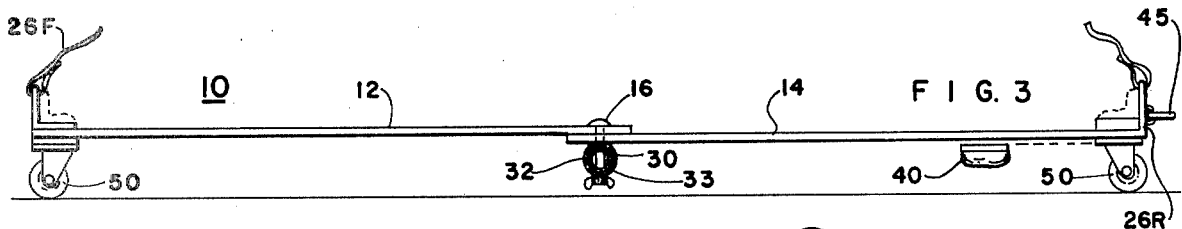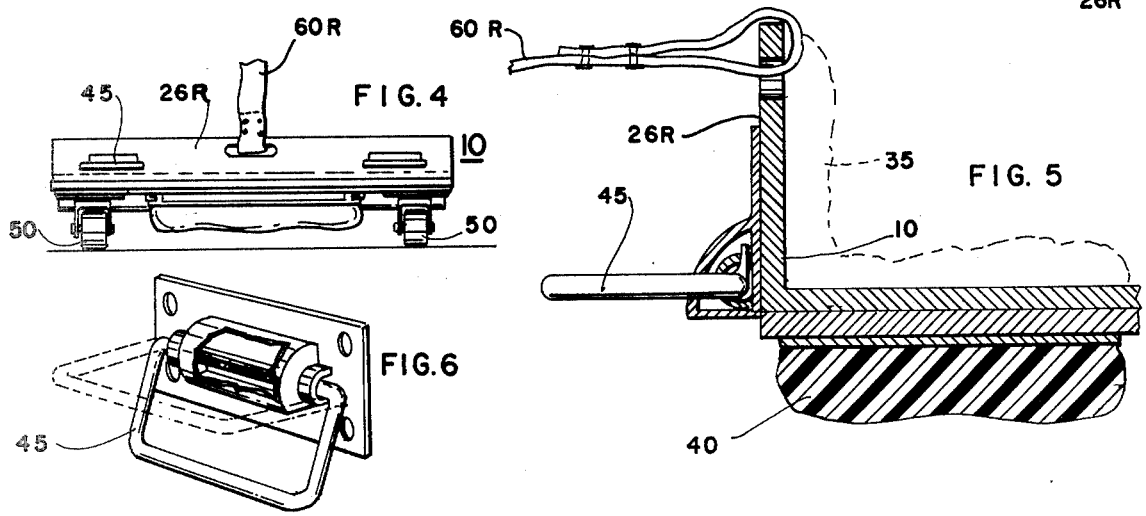

ADJUSTABLE DOLLY

BACKGROUND OF THE INVENTION

Adjustable wheeled platforms are described in U.S. Pat. Nos. 2,480,025; 3,331,613; 2,654,421; and 3,061,327, but these prior art references do not suggest the novel structure and effective combination of the features of my invention.

SUMMARY OF THE INVENTION

My invention is a wheeled platform base of adjustable length, fitted with straps for securing a load to the base, with projecting handles mounted to an end wall of the base and with shoulder padding fixed under the base end to enable a household mover to lift and support an end of the carriage on his shoulder for the moving of items of furniture placed on the base.

BRIEF DESCRIPTION OF THE DRAWINGS

The objects and features of the invention may be understood with reference to the following detailed description of an illustrative embodiment of the invention, taken together with the accompanying drawings in which:

FIG. 1 is a perspective view of the invention;

FIG. 2 is a plan view of the invention;

FIG. 3 is a side view of the invention;

FIG. 4 is an end view of the invention taken along line IV—IV of FIG. 2;

FIG. 5 is a detail sectional side view of the invention; and

FIG. 6 is a detail perspective view of a handle.

DESCRIPTION OF THE PREFERRED EMBODIMENT

Turning now descriptively to the drawings, in which similar reference characters denote similar elements throughout the several views, FIGS. 1-4 illustrate the dolly 10 formed of two frame sections 12, 14 slidably joined to each other by bolts 16 that each ride in a longitudinal slot 22 on the side of each frame section 12, 14 so as to permit adjustment of length of the assembled dolly 10.

Each section 12, 14 is formed of an end aluminum upright angle member 26F, 26R, joined by screws 29 at each end to a longitudinal plate 28, with each plate 28 formed with axial slots 22. A cross-member 30 in the form of a metal tube 32 enclosed by a rubber covering is fastened by bolts 16 to serve as a reinforcement and an auxilliary hand-grip.

Rubber or other flexible padding 35 may be bonded to the inside faces of angle members 26F, 26R.

Flexible shoulder pad 40 is bonded to the underside of rear angle meber 26R to permit resting of the rear angle member on a shoulder of a user lifting the rear end of the dolly up a flight of stairs, with a pair of handles 45 pivotally mounted to the rear face of rear angle member 26R so as to extend in a vertical or horizontal plane, as required to permit the said user to initially manually lift the rear end of the dolly.

Caster wheels 50 are mounted under each angle member for rolling the dolly on a flat surface.

An individual strap 60F, 60R is fixed through a slot in each angle member 26F, 26R respectively with strap 60F fitted with a buckle for fastening to strap 60R so as to form a closed loop about a package (not shown) resting on the plates 12, 14.

The dolly 10 is primarily designed for use by a team of household movers for moving of items of furniture or household appliances and is of particular value in the carrying of such loads up or down a staircase.

In use, the load is placed on frame section 12, 14 and the length of the dolly adjusted by sliding the frame section towards each other with bolts 16 sliding in slots 22 and tightened when the dolly is adjusted to the length of the load, which is fastened in place by straps 60F and 60R.

A conventional sling (not shown), used in the moving industry, is then slipped under two forward wheels 50 and suspended about the underside of the frame and the load to enable a forward man of a team of two movers to raise and pull the dolly forwards.

The dolly may be rolled by two men to an up staircase, with both men raising the dolly to the level of the third stair tread above the floor level, with the forward man raising the dolly by the sling and the rear man raising the dolly by gripping of handles 45. With the rear man supporting the dolly by placing his shoulder under shoulder pad 40 and transfering his hands to grip bar 30, the forward man lifts the sling to raise the dolly to a forty-five degree angle parallel to the axis of the staircase and the two men then lift the dolly up the staircase to the top staircase landing, where the dolly is set on its wheels and rolled to position.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what is claimed as new and to be secured by Letters Patent of the United States is:

1. A platform base fitted with caster wheels with means to adjust the length of the base, comprising two U-shaped elements, each formed with a pair of spaced leg portions joined to a bight portion, with caster wheels mounted under each U-shaped element, in which each leg portion is formed with a longitudinal slot, together with a pair of bolts, with each leg portion of each U-shaped element slidably joined to a corresponding leg portion of the other U-shaped element by a said bolt, with a cushion mounted under the bight portion of one U-shaped element adaptable for resting against the shoulder of a user, and with a pair of hand grips extending externally from the bight section of the other U-shaped element for use in lifting that end of the base, together with a cross-bar fastened at each opposed end to one of said bolts that join the leg portions of the U-shaped element, and with means to fasten a strap to each U-shaped element for use in fastening a load on the platform base.

2. The combination as recited in claim 1, in which the cross-bar is externally fitted with padding to serve as a manual grip.

* * * * *